United States Patent
Lue

(10) Patent No.: US 12,555,618 B2
(45) Date of Patent: Feb. 17, 2026

(54) MEMORY DEVICE AND COMPUTATION METHOD THEREOF

(71) Applicant: MACRONIX INTERNATIONAL CO., LTD., Hsinchu (TW)

(72) Inventor: Hang-Ting Lue, Zhubei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 146 days.

(21) Appl. No.: 18/735,522

(22) Filed: Jun. 6, 2024

(65) Prior Publication Data

US 2025/0378861 A1    Dec. 11, 2025

(51) Int. Cl.
  G11C 7/12    (2006.01)
  G11C 7/10    (2006.01)
  G11C 7/16    (2006.01)

(52) U.S. Cl.
  CPC .............. G11C 7/16 (2013.01); G11C 7/1096 (2013.01); G11C 7/12 (2013.01)

(58) Field of Classification Search
  CPC ............ G11C 7/16; G11C 7/1096; G11C 7/12
  USPC ..................................................... 365/185.03
  See application file for complete search history.

(56) References Cited

U.S. PATENT DOCUMENTS

| | | | |
|---|---|---|---|
| 8,724,390 B2* | 5/2014 | Hung | G11C 16/0483 365/204 |
| 9,076,546 B2* | 7/2015 | Nakayama | G11C 16/26 |
| 10,741,247 B1 | 8/2020 | Yeh | |
| 10,783,938 B2* | 9/2020 | Katoch | G11C 7/06 |
| 10,971,230 B2 | 4/2021 | Park | |
| 12,131,772 B2* | 10/2024 | Yeh | G11C 16/24 |
| 2021/0390391 A1* | 12/2021 | Jung | G11C 7/16 |
| 2022/0398438 A1 | 12/2022 | Zhang | |
| 2023/0368841 A1 | 11/2023 | Lue | |
| 2024/0013850 A1* | 1/2024 | Wu | G06F 7/4925 |

(Continued)

FOREIGN PATENT DOCUMENTS

| | | |
|---|---|---|
| CN | 110892480 A | 3/2020 |
| CN | 111338601 A | 6/2020 |

OTHER PUBLICATIONS

Analog Computing in Memory (CIM) Technique for General Matrix Multiplication (GEMM) to Support Deep Neural Network (DNN) and Cosine Similarity Search Computing using 3D AND-type NOR Flash Devices; 978-1-6654-8959-1/22/$31.00 © 2022 IEEE; pp. 33.3.1-33.3.4.

(Continued)

Primary Examiner — Ly D Pham
(74) Attorney, Agent, or Firm — McClure, Qualey & Rodack, LLP

(57) ABSTRACT

The application discloses a memory device and a computation method. A first weight group generates a first input weight product current on a first global bit line basing on one of a plurality of inputs, and a second weight group generates a second input weight product current on a second global bit line basing on the one of the plurality of inputs. The first global bit line and the second global bit line output the first input weight product current and the second input weight product current to a first differential ADC. The first differential ADC outputs a product accumulation operation result basing on the first input weight product current and the second input weight product current.

20 Claims, 7 Drawing Sheets

(56) References Cited

U.S. PATENT DOCUMENTS

2024/0028211 A1    1/2024   Lue

OTHER PUBLICATIONS

Chip Demonstration of a High-Density (43Gb) and High-Search-Bandwidth (300Gb/s) 3D NAND Based In-Memory Search Accelerator for Ternary Content Addressable Memory (TCAM) and Proximity Search of Hamming Distance; 978-4-86348-806-9 © 2023 JSAP; pp. 1-2.

* cited by examiner

MEMORY DEVICE AND COMPUTATION METHOD THEREOF

TECHNICAL FIELD

The disclosure relates in general to a memory device and a computation method and more particular to an in-memory computing (IMC) memory device and an IMC method thereof.

BACKGROUND

Memory devices play a crucial role in electronic devices. They are essential components in computer systems and electronic devices used for storing and retrieving data. The following highlights some importance of memory devices.

Data Storage: Memory devices are used to store the programs and data necessary for the operation of computer systems and electronic devices. Advances in technology have led to an increase in memory device capacity, enabling the processing of larger and more complex data.

Fast Access: Memory devices provide fast data access speeds, contributing to the improvement of system performance, which is crucial for the operation of computer systems and electronic devices.

Running Applications: Larger memory capacity allows for the simultaneous operation of multiple applications, enhancing multitasking efficiency.

System Stability: The stability and reliability of memory devices directly impact system stability. Issues with memory devices can lead to system crashes or data corruption.

In summary, memory devices are indispensable in computer systems and electronic devices, influencing performance, operating speed, and system stability. For modern computer systems and electronic devices, having memory devices with appropriate capacity and high efficiency is key to achieving smooth operation and handling complex tasks.

In-Memory Computing (IMC) refers to storing data in memory (for example, random access memory (RAM)) to achieve faster data access and real-time analysis. IMC enhances data processing speed and performance.

Here are some characteristics and advantages of In-Memory Computing:

Fast Access: Storing data in main memory allows the system to access and retrieve data more quickly, as the read/write speed of RAM is much faster than traditional hard drives.

Real-time Analysis: IMC enables real-time analysis and queries, as data can be immediately retrieved from memory.

High Performance: By reducing data access time, IMC improves the overall performance of computer systems and electronic devices, especially in scenarios involving large amounts of data or requiring real-time feedback.

Big Data Processing: In a big data environment, IMC can more effectively process massive datasets, speeding up the processes of data analysis and mining.

IMC has applications in various fields, including financial services, Internet of Things (IOT), and analytics. By leveraging the advantages of main memory, IMC enhances the efficiency of data processing and drives the development of data-intensive applications.

Currently, parallel in-memory computing faces certain bottlenecks. During the process of parallel in-memory computing, a significant voltage drop (IR drop) may occur due to the necessity of accumulating a large amount of cell current. This severe voltage drop could affect the accuracy of in-memory computing.

Therefore, one of the industry's focuses is on how to avoid severe voltage drops and enhance the accuracy of in-memory computing during parallel IMC.

SUMMARY

According to one embodiment, provided is a memory device, comprising: a plurality of summation groups, each of summation groups including a first weight group and a second weight group, wherein the first weight group comprises a plurality of first memory string pairs, a plurality of first selection switch pairs having a plurality of first selection switches, and one or more first bit line transistors, and the second weight group comprises a plurality of second memory string pairs, a plurality of second selection switch pairs having a plurality of second selection switches, and one or more second bit line transistors; a plurality of global bit line pairs coupled to the summation groups, wherein the first memory string pairs and the second memory string pairs are coupled to the global bit line pairs through the first selection switch pairs and the second selection switch pairs, respectively; a plurality of differential analog-to-digital converters (ADCs), each of the differential ADCs is coupled to a corresponding one of the global bit line pairs; a plurality of string select line pairs, each of the string select line pairs coupled to one of the first selection switch pairs and one of the second selection switch pairs, and each of the string select line pairs is configured to receive one of a plurality of inputs; a plurality of threshold voltages of a plurality of memory cells of the first memory string pairs of the first weight group are combined to form a plurality of first weights; a plurality of threshold voltages of a plurality of memory cells of the second memory string pairs of the second weight group are combined to form a plurality of second weights. The first weight group generates a first input weight product current on a first global bit line of the global bit line pairs basing on the one of the plurality of inputs, and the second weight group generates a second input weight product current on a second global bit line of the global bit line pairs basing on the one of the plurality of inputs. The first global bit line and the second global bit line output the first input weight product current and the second input weight product current to a first differential ADC of the differential ADCs. The first differential ADC outputs a product accumulation operation result basing on the first input weight product current and the second input weight product current.

According to another embodiment, provided is a computing method for a memory device, comprising: inputting a plurality of inputs to a plurality of summation groups of the memory device through a plurality of string select line pairs, each of summation groups including a first weight group and a second weight group, a plurality of threshold voltages of a plurality of memory cells of the first memory string pairs of the first weight group combined to form a plurality of first weights, a plurality of threshold voltages of a plurality of memory cells of the second memory string pairs of the second weight group are combined to form a plurality of second weights; generating by the first weight group a first input weight product current on a first global bit line of the global bit line pairs basing on the one of the plurality of inputs, and generating by the second weight group a second input weight product current on a second global bit line of the global bit line pairs basing on the one of the plurality of inputs; outputting the first input weight product current and the second input weight product current from the first global bit line and the second global bit line to a first differential ADC of the differential ADCs; and outputting from the first differential ADC a product accumulation operation result basing on the first input weight product current and the second input weight product current.

Figure 1:
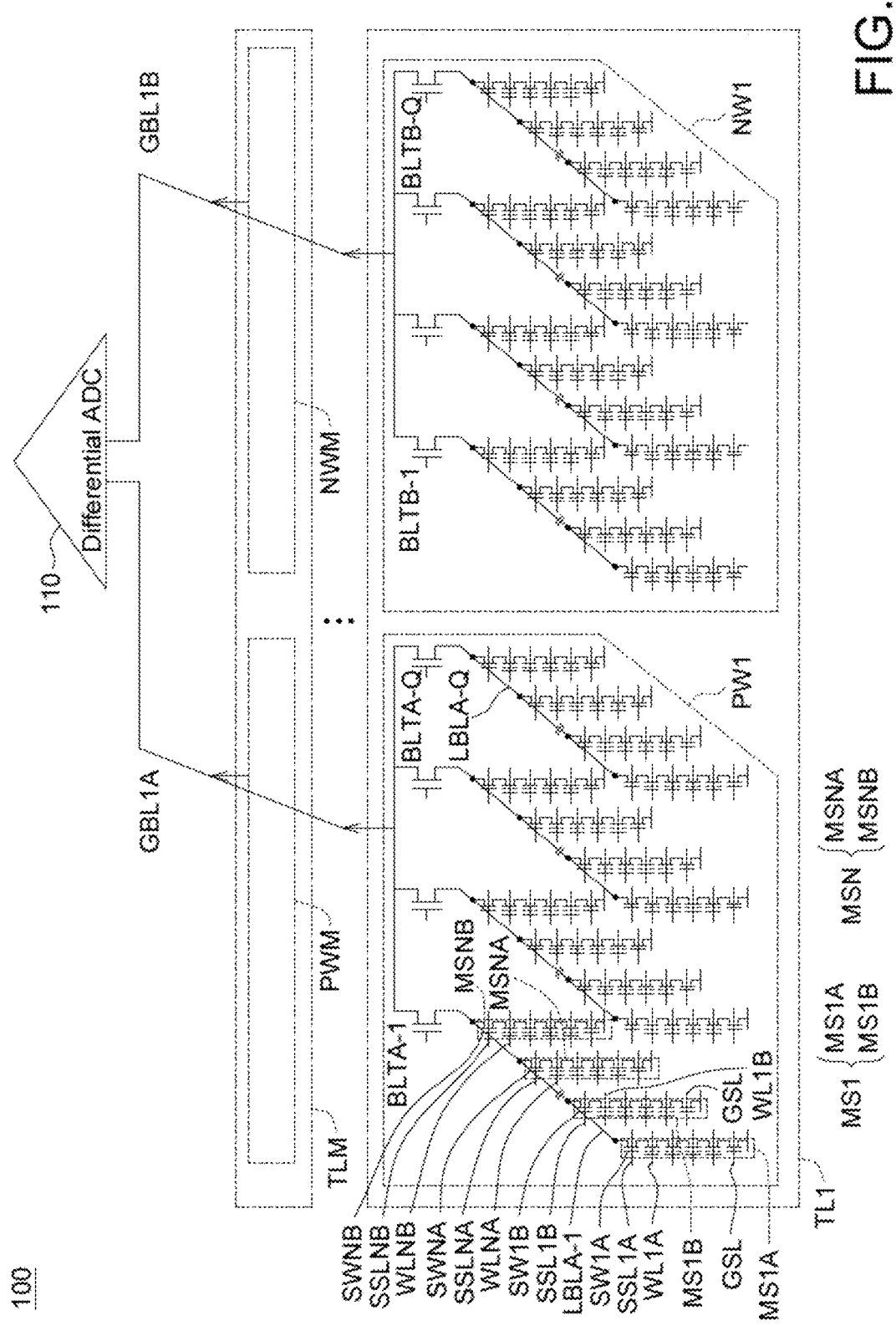
FIG. 1 depicts the circuit diagram of a memory device for In-Memory Computing (IMC) according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

FIG. 1 depicts the circuit diagram of a memory device for In-Memory Computing (IMC) according to an embodiment of the present disclosure. As shown in FIG. 1, the IMC memory device 100 (hereinafter also referred to as memory device 100) according to an embodiment of the present disclosure includes: multiple summation groups TL1-TLM (where M is a positive integer), multiple global bit line (GBL) pairs (such as GBL1A and GBL1B), and multiple differential analog-to-digital converters (ADC) 110.

The architecture of these summation groups TL1-TLM is basically the same or similar. For simplicity, only the summation group TL1 is described below, and the others can be understood accordingly.

The summation group TL1 includes a first positive weight group PW1 and a first negative weight group NW1. The structure of the first positive weight group PW1 and the first negative weight group NW1 is basically the same or similar. Similarly, the summation group TLM includes a M-th positive weight group PWM and a M-th negative weight group NWM.

The first positive weight group PW1 includes: multiple memory string pairs (such as MS1~MSN, where N is a positive integer), multiple selection switch pairs having multiple selection switches SW1A, SW1B, . . . SWNA, SWNB, and one or more bit line transistors BLTA-1-BLTA-Q (where Q is a positive integer). The memory string pair MS1 includes memory strings MS1A and MS1B, and each memory string (MS1A or MS1B) includes multiple memory cells. Memory strings MS1A and MS1B respectively have selection switches SW1A and SW1B, where memory strings MS1A and MS1B are coupled to a global bit line GBL1A through selection switches SW1A and SW1B, and memory strings MS1A, MS1B, . . . , MSNA, MSNB are coupled to a global source line GSL. Selection switches SW1A, SW1B, . . . , SWNA, SWNB are controlled by inputs on string select lines SSL1A, SSL1B, . . . , SSLNA, and SSLNB, where string select lines SSL1A and SSL1B together are referred to as a string select line pair. For example, when the input on string select line SSL1A is logic 1 (logic high), switch SW1A is conductive; and when the input on string select line SSL1A is logic 0 (logic low), switch SW1A is turned off. Of course, the present disclosure is not limited to this. The bit line transistors BLTA-1-BLTA-Q have first terminals coupled to the local bit lines LBLA-1-LBLA-Q, second terminals receiving control signals and third terminals coupled to the global bit line GBL1A. The bit line transistors BLTA-1-BLTA-Q are high voltage transistors. In one example, the memory strings MS1A, MS1B, . . . , MSNA, MSNB are coupled to the global bit line GBL1A through the bit line transistor BLTA-1 and the local bit line LBLA-1.

Similarly, the first negative weight group NW1 includes: multiple memory string pairs, multiple selection switch pairs having multiple selection switches, and one or more bit line transistors BLTB-1-BLTB-Q (where Q is a positive integer). Memory strings of the multiple memory string pairs are coupled to a global bit line GBL1B through selection switches of the multiple selection switch pairs. The bit line transistors BLTB-1-BLTB-Q have first terminals coupled to the local bit lines, second terminals receiving control signals and third terminals coupled to the global bit line GBL1B. The bit line transistors BLTB-1-BLTB-Q are high voltage transistors. In one example, the memory strings of each of the multiple memory string pairs are coupled to the corresponding global bit line (such as GBL1B) through the corresponding bit line transistor (such as BLTB-1) and the corresponding local bit line (such as LBLB-1).

Each of these global bit line pairs includes two global bit lines (such as global bit lines GBL1A and GBL1B in FIG. 1).

Each of these differential analog-to-digital converters (ADC) 110 is coupled to the corresponding global bit line pair. For example, the first ADC 110 is coupled to the corresponding global bit line pair GBL1A and GBL1B. This can be extrapolated for the rest.

FIGS. 2A to 2I show schematic diagrams of IMC according to an embodiment of the present disclosure. In the embodiment of the present disclosure, when the input is +1, string select line SSL1A receives logic 1 and string select line SSL1B receives logic 0. When the input is 0, string select line SSL1A receives logic 0 and string select line SSL1B receives logic 0. When the input is −1, string select line SSL1A receives logic 0 and string select line SSL1B receives logic 1.

Figure 2A:
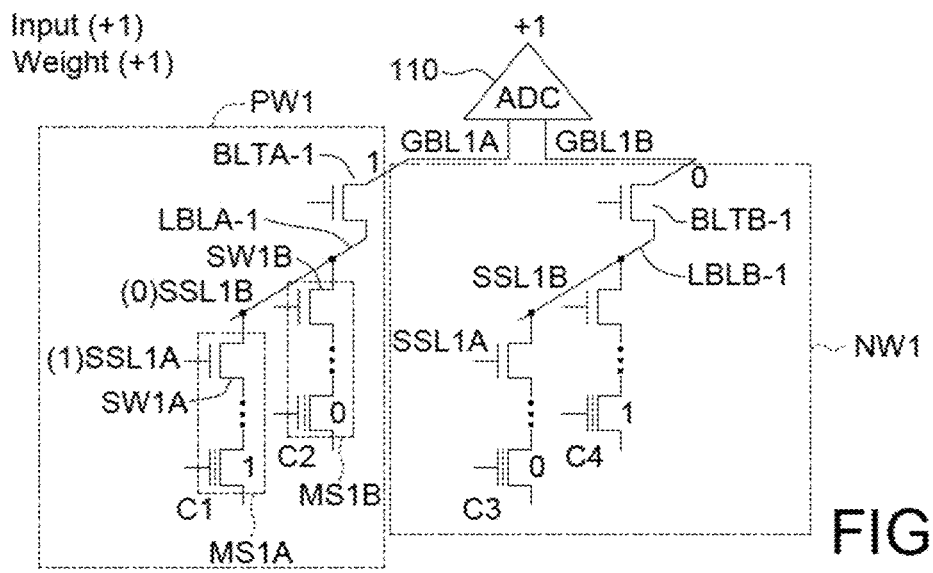
FIGS. 2A to FIG. 2I shows IMC operations according to one embodiment of the application.
Figure 2B:
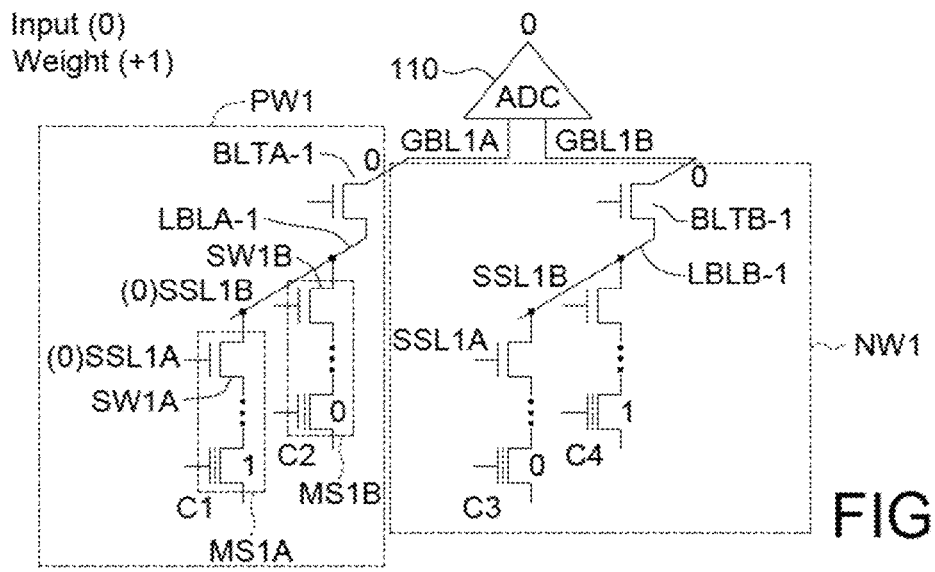
Figure 2C:
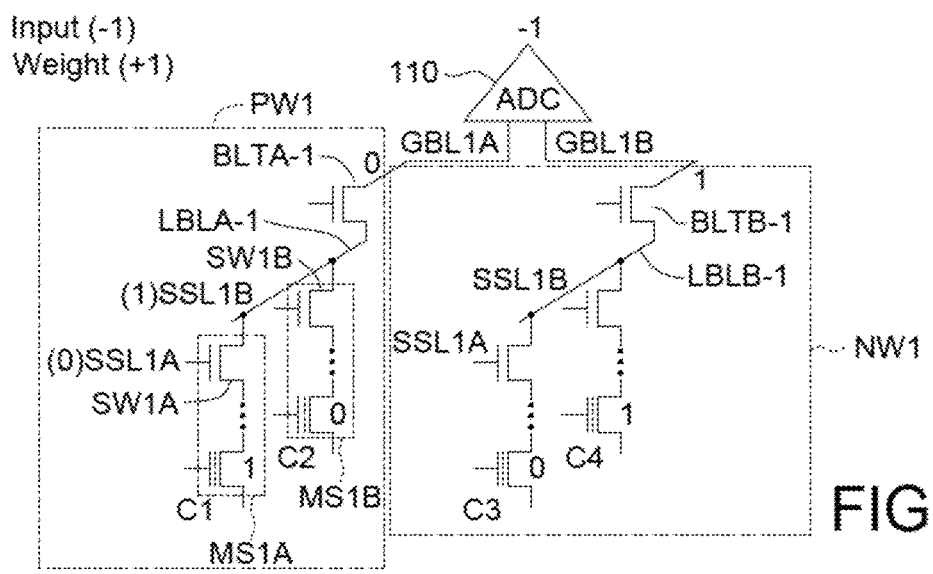

In the embodiment of the present disclosure, when the weight is +1 as shown in FIGS. 2A to 2C, memory cell C1 of memory string MS1A of the first positive weight group PW1 is programmed to low threshold voltage (indicated as logic 1 in FIGS. 2A to 2C); memory cell C2 of memory string MS1B of the first positive weight group PW1 is programmed to high threshold voltage (indicated as logic 0 in FIGS. 2A to 2C); memory cells C3 and C4 of the first negative weight group NW1 are programmed to high threshold voltage (referred as logic 0) and low threshold voltage (referred as logic 1) respectively. In this embodiment, the conduction current of memory cells with low threshold voltage (e.g., but not limited to 16 nA) is much higher than that of memory cells with high threshold voltage (e.g., but not limited to ~0 nA). When the coupled word line is selected, those memory cells with low threshold voltage coupled to the selected word line (also referred to as selected memory cells) are conductive.

Figure 2D:
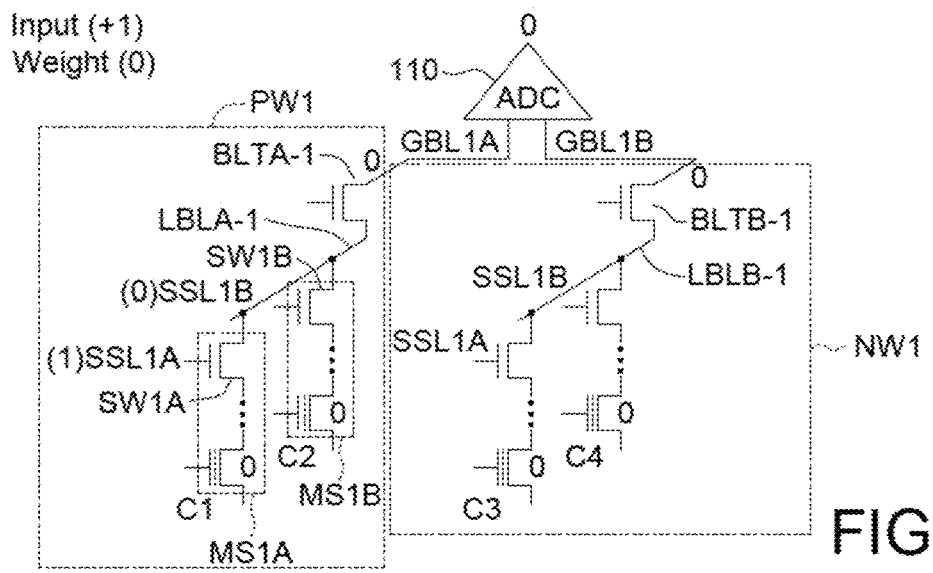
Figure 2E:
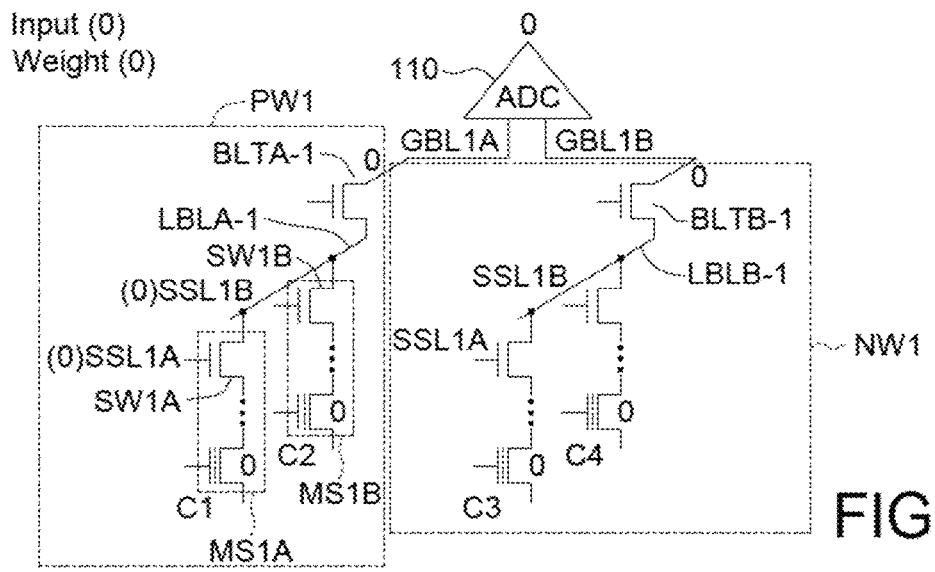
Figure 2F:
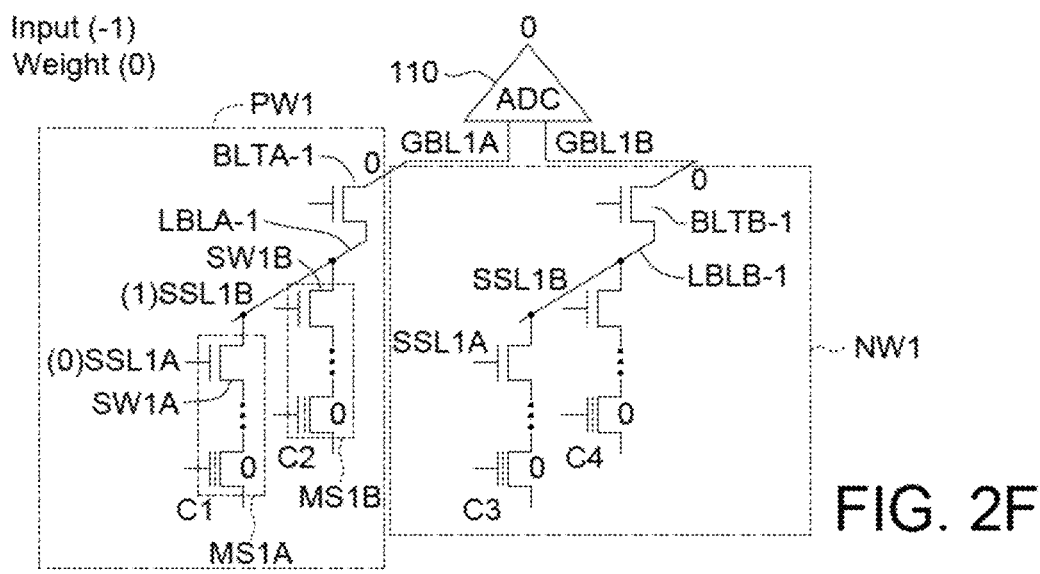

Similarly, in the embodiment of the present disclosure, when the weight is 0 as shown in FIGS. 2D to 2F, memory cell C1 of memory string MS1A of the first positive weight group PW1 is programmed to high threshold voltage (referred as logic 0); memory cell C2 of memory string MS1B of the first positive weight group PW1 is programmed to high threshold voltage (referred as logic 0); memory cells C3 and C4 of the first negative weight group NW1 are programmed to high threshold voltage (referred as logic 0).

Figure 2G:
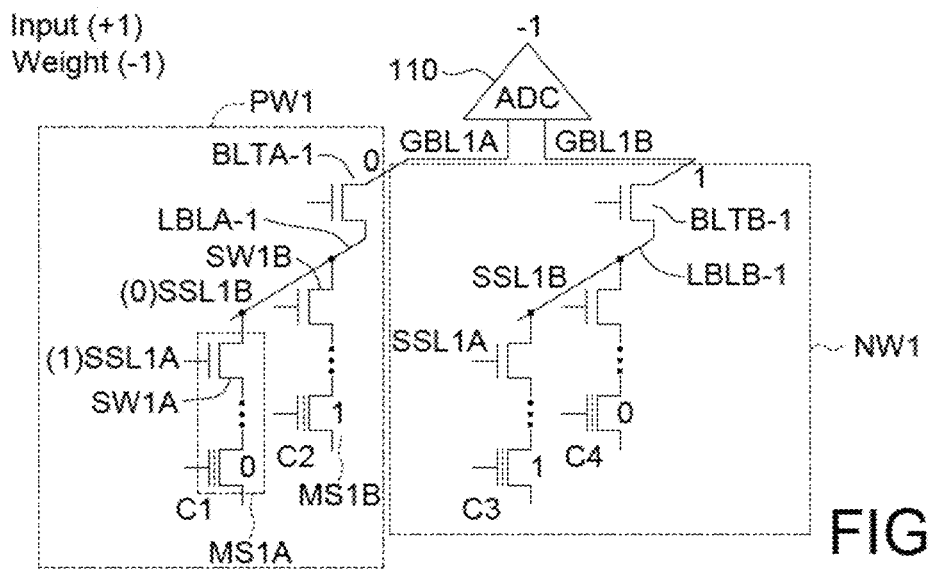
Figure 2H:
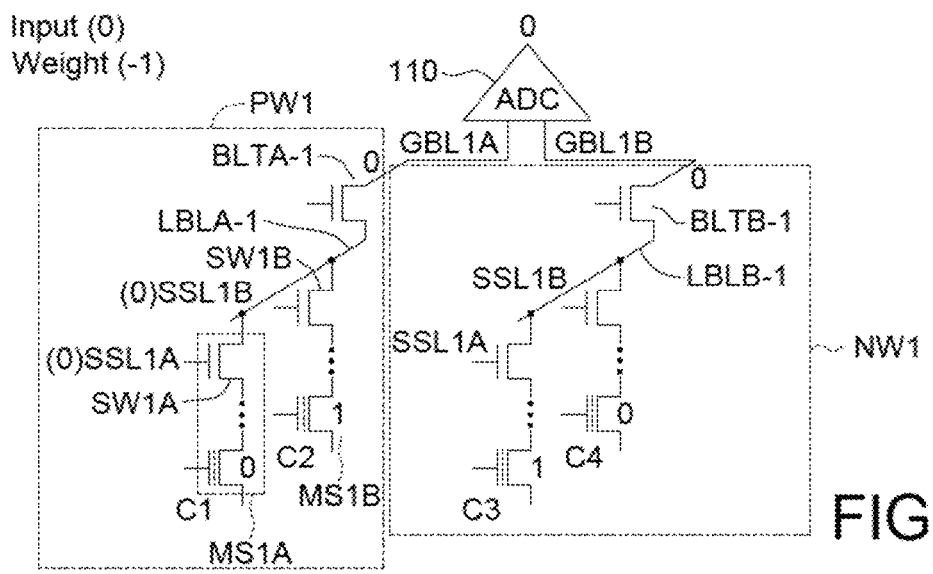
Figure 2I:
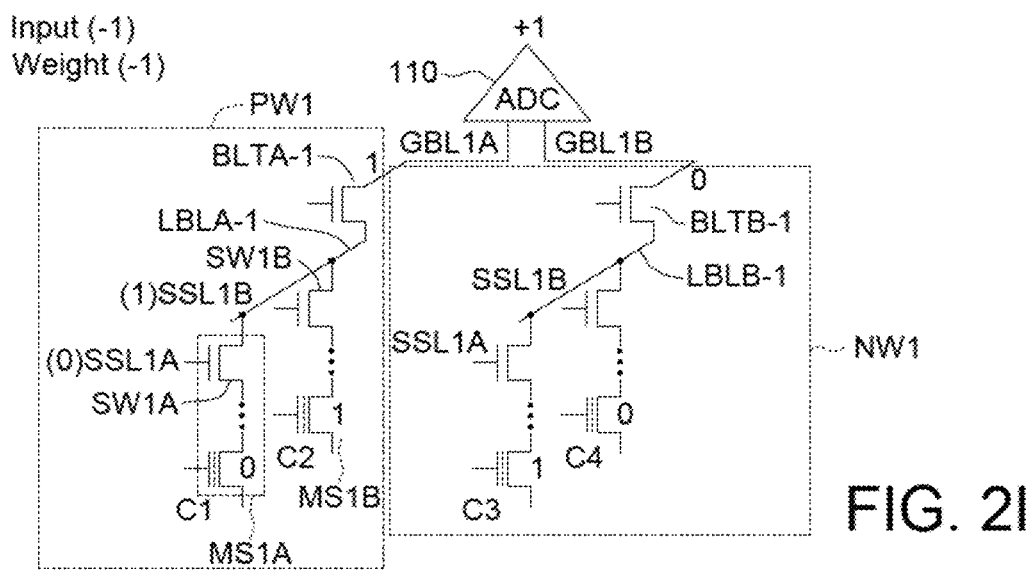

Similarly, in the embodiment of the present disclosure, when the weight is −1 as shown in FIGS. 2G to 2I, memory cell C1 of memory string MS1A of the first positive weight group PW1 is programmed to high threshold voltage (referred as logic 0); memory cell C2 of memory string MS1B of the first positive weight group PW1 is programmed to low threshold voltage (referred as logic 1); memory cell C3 of the first negative weight group NW1 is programmed to low threshold voltage (referred as logic 1); and memory cell C4 of the first negative weight group NW1 is programmed to high threshold voltage (referred as logic 0).

In this embodiment, the weight value determines whether the selected two memory cells (such as C1 and C2) of the positive weight group (such as PW1) and the selected two memory cells (such as C3 and C4) of the negative weight group (such as NW1) are programmed to high or low threshold voltages.

In FIG. 2A, when the input is +1, the input on string select line SSL1A is logic 1, causing the selection switch SW1A coupled to string select line SSL1A to be conductive, and the input on string select line SSL1B is logic 0, causing the selection switch SW1B coupled to string select line SSL1B to be disconnected. Additionally, when the weight is +1, memory cell C1 (programmed to low threshold voltage) of the positive weight group (such as PW1) coupled to the selected word line outputs a higher cell current, while memory cell C2 (programmed to high threshold voltage) of the positive weight group (such as PW1) outputs a lower cell current (even close to 0 nA). Therefore, the cell current output by memory cell C1 is summed to the global bit line GBL1A via local bit line LBLA-1. Because the selection switch (SW1B) is off, the cell current from the memory cell C2 of the positive weight group (such as PW1) cannot be output to the local bit line LBLA-1 and the global bit line GBL1A. Similarly, when the weight is +1, memory cell C3 (programmed to high threshold voltage) of the negative weight group (such as NW1) coupled to the selected word line outputs a lower cell current (even close to 0 nA), and memory cell C4 (programmed to low threshold voltage) of the negative weight group (such as NW1) outputs a higher cell current. Due to the related selection switch being off, the cell current from memory cell C4 cannot be output to local bit line LBLB-1 and the global bit line GBL1B. Although selection switch being on, the cell current from memory cell C3 of the negative weight group (such as NW1) is a low cell current (even close to 0 nA). The cell current from memory cell C3 output to the local bit line LBLB-1 and the global bit line GBL1B can be neglected. Thus, in FIG. 2A, when the input is +1 and the weight is +1, the first positive weight group PW1 generates cell current (also known as positive input weight product current) to global bit line GBL1A, but the first negative weight group NW1 does not generate cell current to global bit line GBL1B.

Similarly, in FIG. 2B, when the input is 0, the related selection switches (such as SW1A and SW1B) are off, so regardless of whether memory cells C1-C4 generate cell currents, there is no current appearing on the local bit lines (LBLA-1 and LBLB-1) and the global bit lines (GBL1A and GBL1B). Therefore, when the input is 0 and the weight is +1, the first positive weight group PW1 does not generate cell current to global bit line GBL1A, and the first negative weight group NW1 does not generate cell current to global bit line GBL1B.

In FIG. 2C, when the input is −1, the input on string select line SSL1A is logic 0, causing the selection switch SW1A coupled to string select line SSL1A to be disconnected, and the input on string select line SSL1B is logic 1, causing the selection switch SW1B coupled to string select line SSL1B to be conductive. Additionally, when the weight is +1, memory cell C1 (programmed to low threshold voltage) of the positive weight group (such as PW1) coupled to the selected word line outputs a higher cell current, while memory cell C2 (programmed to high threshold voltage) of the positive weight group (such as PW1) outputs a lower cell current (even close to 0 nA). Therefore, the higher cell current output by memory cell C1 cannot be output to the local bit line LBLA-1 and the global bit line GBL1A because the related selection switch (SW1A) is disconnected. Because the selection switch (SW1B) is on, the lower cell current from the memory cell C2 of the positive weight group (such as PW1) is output to local bit line LBLA-1 and the global bit line GBL1A but can be neglected. When the weight is +1, memory cell C3 (programmed to high threshold voltage) of the negative weight group (such as NW1) coupled to the selected word line outputs a lower cell current (even close to 0 nA), and memory cell C4 (programmed to low threshold voltage) of the negative weight group (such as NW1) outputs a higher cell current. Due to the related selection switch being on, the higher cell current from the memory cell C4 is summed on the local bit line LBLB-1 and the global bit line GBL1B. The cell current from memory cell C3 of the negative weight group (such as NW1) outputs a low cell current (even close to 0 nA), but because the related selection switch is off, the cell current from memory cell C3 cannot be output to the local bit line LBLB-1 and the global bit line GBL1B. Thus, in FIG. 2C, when the input is −1 and the weight is +1, the first positive weight group PW1 does not generate cell current to global bit line GBL1A, and the first negative weight group NW1 generates cell current (also known as negative input weight product current) to global bit line GBL1B.

In FIG. 2D, when the input is +1, the input on string select line SSL1A is logic 1, causing the selection switch SW1A coupled to string select line SSL1A to be conductive, and the input on string select line SSL1B is logic 0, causing the selection switch SW1B coupled to string select line SSL1B to be disconnected. When the weight is 0, memory cell C1 (programmed to high threshold voltage) of the positive weight group (such as PW1) outputs a lower cell current (even close to 0 nA); memory cell C2 (programmed to high threshold voltage) of the positive weight group (such as PW1) outputs a lower cell current (even close to 0 nA); memory cell C3 (programmed to high threshold voltage) of the negative weight group (such as NW1) outputs a lower cell current (even close to 0 nA); and memory cell C4 (programmed to high threshold voltage) of the negative weight group (such as NW1) outputs a lower cell current (even close to 0 nA). Because the selection switch is off, the cell current from the memory cell C2 of the positive weight group (such as PW1) cannot be output to the local bit line LBLA-1 and the global bit line GBL1A; and the cell current from the memory cell C4 of the negative weight group (such as NW1) cannot be output to the local bit line LBLB-1 and the global bit line GBL1B. Although selection switch being on, the cell current from memory cell C1 of the positive weight group (such as PW1) outputs a low cell current (even close to 0 nA); and the cell current from memory cell C1 output to the local bit line LBLA-1 and the global bit line GBL1A can be neglected. Although selection switch being on, the cell current from memory cell C3 of the negative weight group (such as NW1) outputs a low cell current (even close to 0 nA); and the cell current from memory cell C3 output to the local bit line LBLB-1 and the global bit line GBL1B can be neglected. Thus, in FIG. 2D, when the input is +1 and the weight is 0, the first positive weight group PW1 does not generate cell current to global bit line GBL1A, and the first negative weight group NW1 does not generate cell current to global bit line GBL1B.

Similarly, in FIG. 2E, when the input is 0, the related selection switches (such as SW1A and SW1B) are off, so regardless of whether memory cells C1-C4 generate cell currents, there is no current appearing on the local bit lines (LBLA-1 and LBLB-1) and the global bit lines (GBL1A and GBL1B). Therefore, when the input is 0 and the weight is 0, the first positive weight group PW1 does not generate cell current to global bit line GBL1A, and the first negative weight group NW1 does not generate cell current to global bit line GBL1B.

In FIG. 2F, when the input is −1, the input on string select line SSL1A is logic 0, causing the selection switch SW1A coupled to string select line SSL1A to be disconnected, and the input on string select line SSL1B is logic 1, causing the selection switch SW1B coupled to string select line SSL1B to be conductive. When the weight is 0, memory cell C1 (programmed to high threshold voltage) of the positive weight group (such as PW1) outputs a lower cell current (even close to 0 nA); memory cell C2 (programmed to high threshold voltage) of the positive weight group (such as PW1) outputs a lower cell current (even close to 0 nA); memory cell C3 (programmed to high threshold voltage) of the negative weight group (such as NW1) outputs a lower cell current (even close to 0 nA); and memory cell C4 (programmed to high threshold voltage) of the negative weight group (such as NW1) outputs a lower cell current (even close to 0 nA). Because the selection switch is off, the cell current from the memory cell C1 of the positive weight group (such as PW1) cannot be output to the local bit line LBLA-1 and the global bit line GBL1A; and the cell current from the memory cell C3 of the negative weight group (such as NW1) cannot be output to the local bit line LBLB-1 and the global bit line GBL1B. Although selection switch being on, the cell current from memory cell C2 of the positive weight group (such as PW1) outputs a low cell current (even close to 0 nA); and the cell current from memory cell C2 output to the local bit line LBLA-1 and the global bit line GBL1A can be neglected. Although selection switch being on, the cell current from memory cell C4 of the negative weight group (such as NW1) outputs a low cell current (even close to 0 nA); and the cell current from memory cell C4 output to the local bit line LBLB-1 and the global bit line GBL1B can be neglected. Therefore, in FIG. 2F, when the input is −1 and the weight is 0, the first positive weight group PW1 does not generate cell current to global bit line GBL1A, and the first negative weight group NW1 does not generate cell current to global bit line GBL1B.

In FIG. 2G, when the input is +1, the input on string select line SSL1A is logic 1, causing the selection switch SW1A coupled to string select line SSL1A to be conductive, and the input on string select line SSL1B is logic 0, causing the selection switch SW1B coupled to string select line SSL1B to be disconnected. Additionally, when the weight is −1, memory cell C1 of the positive weight group (such as PW1) outputs a lower cell current, while memory cell C2 of the positive weight group (such as PW1) outputs a higher cell current. Therefore, the higher cell current output by memory cell C2 cannot be output to the local bit line LBLA-1 and the global bit line GBL1A because the related selection switch is disconnected. Because the selection switch (SW1A) is on, the lower cell current from the memory cell C1 of the positive weight group (such as PW1) is output to the local bit line LBLA-1 and the global bit line GBL1A but can be neglected. When the weight is −1, memory cell C3 of the negative weight group (such as NW1) coupled to the selected word line outputs a higher cell current, and memory cell C4 of the negative weight group (such as NW1) outputs a lower cell current. Due to the related selection switch being on, the higher cell current from the memory cell C3 is summed on the local bit line LBLB-1 and the global bit line GBL1B. The cell current from memory cell C4 of the negative weight group (such as NW1) outputs a low cell current (even close to 0 nA), but because the related selection switch is off, the cell current from memory cell C4 cannot be output to the local bit line LBLB-1 and the global bit line GBL1B. Therefore, in FIG. 2G, when the input is +1 and the weight is −1, the first positive weight group PW1 does not generate cell current to global bit line GBL1A, and the first negative weight group NW1 generates cell current to global bit line GBL1B.

Similarly, in FIG. 2H, when the input is 0, the related selection switches (such as SW1A and SW1B) are off, so regardless of whether memory cells C1-C4 generate cell currents, there is no current appearing on the local bit lines (LBLA-1 and LBLB-1) and the global bit lines (GBL1A and GBL1B). Therefore, when the input is 0 and the weight is −1, the first positive weight group PW1 does not generate cell current to global bit line GBL1A, and the first negative weight group NW1 does not generate cell current to global bit line GBL1B.

In FIG. 2I, when the input is −1, the input on string select line SSL1A is logic 0, causing the selection switch SW1A coupled to string select line SSL1A to be disconnected, and the input on string select line SSL1B is logic 1, causing the selection switch SW1B coupled to string select line SSL1B to be conductive. Additionally, when the weight is −1, memory cell C1 of the positive weight group (such as PW1) outputs a lower cell current, while memory cell C2 of the positive weight group (such as PW1) outputs a higher cell current. Therefore, the higher cell current output by memory cell C2 is summed on the local bit line LBLA-1 and the global bit line GBL1A because the related selection switch is on. Because the selection switch (SW1A) is off, the lower cell current from the memory cell C1 of the positive weight group (such as PW1) cannot be output to local bit line LBLA-1 and the global bit line GBL1A. When the weight is −1, memory cell C3 of the negative weight group (such as NW1) coupled to the selected word line outputs a higher cell current, and memory cell C4 of the negative weight group (such as NW1) outputs a lower cell current. Due to the related selection switch being on, the lower cell current from the memory cell C4 is summed on the local bit line LBLB-1 and the global bit line GBL1B but are neglected. The memory cell C3 of the negative weight group (such as NW1) outputs a higher cell current, but because the related selection switch is off, the higher cell current from memory cell C3 cannot be output to the local bit line LBLB-1 and the global bit line GBL1B. Therefore, in FIG. 2I, when the input is −1 and the weight is −1, the first positive weight group PW1 generates cell current to global bit line GBL1A, and the first negative weight group NW1 does not generate cell current to global bit line GBL1B.

In this embodiment, within each summation group, the current collected by the positive weight group (coupled to global bit line GBL1A, . . . ) is related to the product of input and weight being greater than 0 (as shown in FIG. 2A and FIG. 2I). The positive weight group transfers the collected current to global bit line GBL1A. While the negative weight group (coupled to global bit line GBL1B, . . . ) collects current related to the product of input and weight being less than 0 (as shown in FIG. 2C and FIG. 2G), and the negative weight group then transfers the collected current to global bit line GBL1B.

In this assumption, within the positive weight group and the negative weight group, there are Q bit line transistors, and the memory device 100 has M summation groups, each summation group having N string select line pairs. For the positive weight group, the Vector Matrix Multiplication (VMM) result of input and weight is as follows:

$$VMM(\text{positive}) = IGBLA = \sum_{i=1}^{M}\sum_{j=1}^{N}\sum_{k=1}^{Q} gm(i,k) * IN(i,j)$$

where gm represents the weight determined by multiple related memory cells, IN represents the input, and IGBLA represents the global bit line current on global bit line GBL1A, . . . .

Similarly, for the negative weight group, the VMM result of input and weight is as follows:

$$VMM(\text{negative}) = IGBLB = \sum_{i=1}^{M}\sum_{j=1}^{N}\sum_{k=1}^{Q} gm(i,k) * IN(i,j)$$

where IGBLB represents the global bit line current on global bit line GBL1B, . . . .

Therefore, during IMC, multiple inputs can simultaneously and independently enter these string select lines SSL1A, SSL1B, . . . SSLNA, SSLNB (i.e. the string select lines SSL1A, SSL1B, . . . SSLNA, SSLNB can receive the inputs simultaneously). These global bit lines GBL1A, GBL1B, . . . collect the currents transmitted from the summation groups TL1-TLM and transmit to the differential ADCs 110. By decoding the output results of these differential ADC 110, the product accumulation operation (Multiply Accumulate, MAC) results of these inputs and weights can be obtained.

Figure 3A:
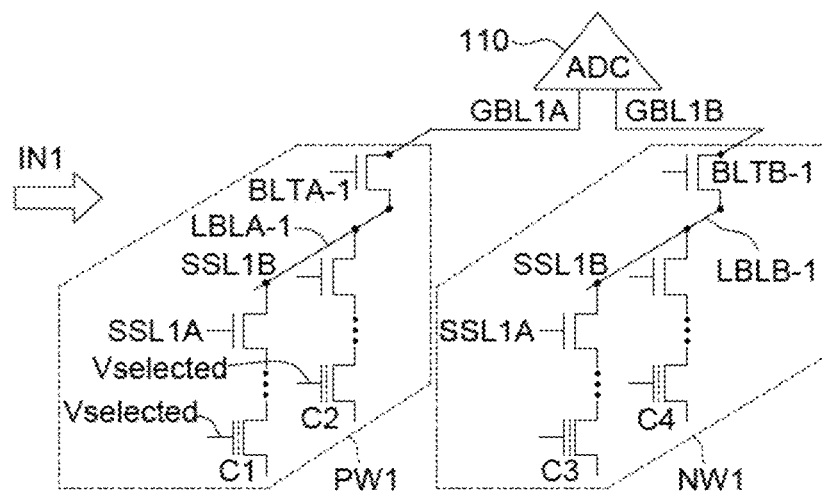
FIGS. 3A to 3C show a simplified schematic diagram of an IMC memory device according to an embodiment of the present invention.
Figure 3B:
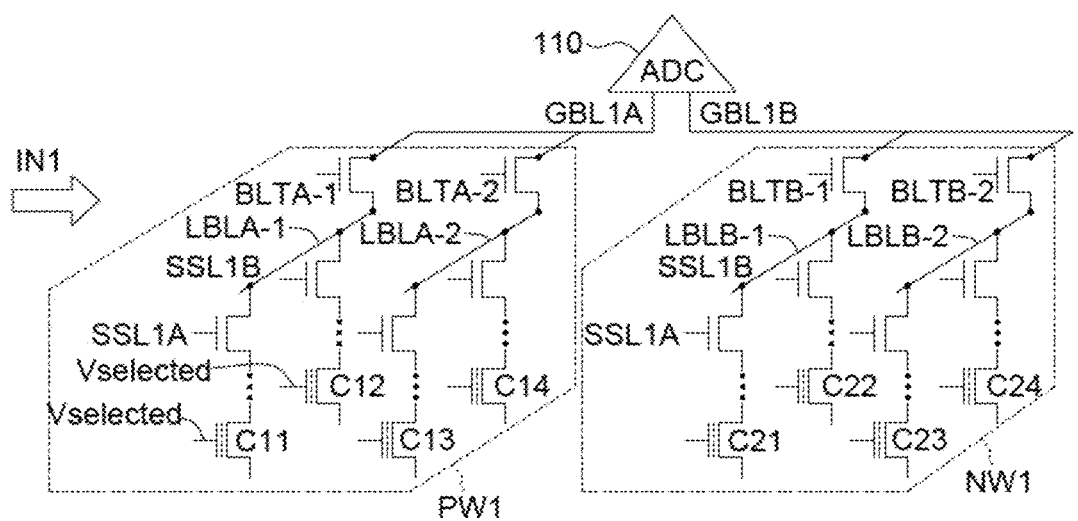
Figure 3C:
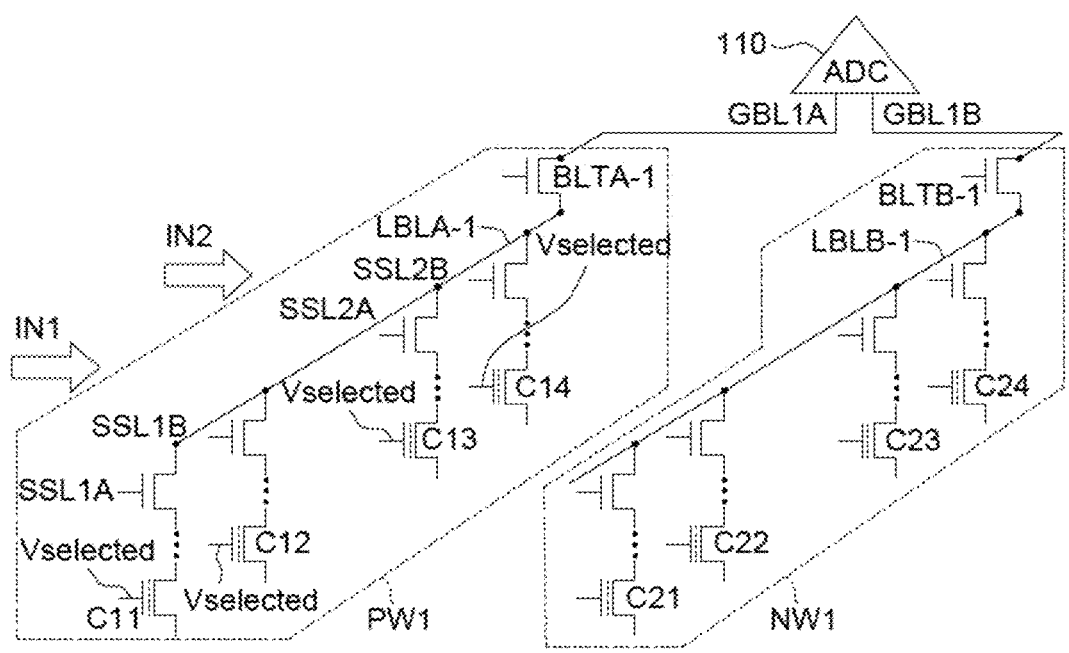

FIGS. 3A to 3C show a simplified schematic diagram of an IMC memory device according to an embodiment of the present invention.

In FIG. 3A, each summation group includes a positive weight group (PW1) and a negative weight group (NW1), and each positive (negative) weight group (PW1 or NW1) includes a bit line transistor (BLTA-1 or BLTB-1). During operation, each summation group receives input IN1 from string select line pairs (SSL1A and SSL1B), where input IN1 can be +1, 0, or −1. The structure of FIG. 3A can compute a 1-bit weight (weight values of +1, 0, or −1). Vselected represents the word line voltage applied to the selected word lines.

Generally speaking, FIG. 3A is a specific example of FIG. 1 of the application with Q=1. FIG. 3A has similar operations in FIG. 2A to FIG. 2I, and thus the details are omitted here.

In FIG. 3B, each summation group includes a positive weight group (PW1) and a negative weight group (NW1), and each positive (or negative) weight group (PW1 or NW1) includes two bit line transistors (BLTA-1 and BLTA-2; BLTB-1 and BLTB-2). Each of the bit line transistors (BLTA-1, BLTA-2, BLTB-1 or BLTB-2) is coupled to a corresponding local bit line (LBLA-1, LBLA-2, LBLB-1 or LBLB-1). The corresponding local bit line (such as LBLA-1) is coupled to at least one memory string pair including a first memory string and a second memory string. The at least one memory string pair has a string select line pair (e.g. SSL1A and SSL1B). Each of the first and second memory strings includes multiple memory cells (for example, C11-C24). One string select line of the string select line pair (e.g. SSL1A and SSL1B) corresponds to the first memory string. The other string select line of the string select line pair (e.g. SSL1A and SSL1B) corresponds to the second memory string. In FIG. 3B, during operation, each summation group receives input IN1 from string select line pairs (SSL1A and SSL1B) of the first memory string and the second memory string, where input IN1 can be +1, 0, or −1.

The structure of FIG. 3B can compute 2-bit weights (weight values of +2, +1, 0, −1, or −2). For example, in the positive weight group (PW1), if there are 2 memory cells coupled to the selected word line programmed as low threshold voltage, the positive weight is +2; if there is 1 memory cell coupled to the selected word line programmed as low threshold voltage, the positive weight is +1; and if there are 0 memory cells coupled to the selected word line programmed as low threshold voltage, the positive weight is 0. Similarly, in the negative weight group (NW1), if there are 2 memory cells coupled to the selected word line programmed as low threshold voltage, the negative weight is −2; if there is 1 memory cell coupled to the selected word line programmed as low threshold voltage, the negative weight is −1; and if there are 0 memory cells coupled to the selected word line programmed as low threshold voltage, the negative weight is 0. Generally speaking, FIG. 3B is a specific example of FIG. 1 of the application with Q=2.

Operations of FIG. 3B are summarized as the following tables 1-1 and 1-2.

TABLE 1-1

| W | C11 | C12 | C13 | C14 | C21 | C22 | C23 | C24 |
|---|-----|-----|-----|-----|-----|-----|-----|-----|
| +2 | 1 | 0 | 1 | 0 | 0 | 1 | 0 | 1 |
| +1 | 1 | 0 | 0 | 0 | 0 | 0 | 1 | 0 |
| 0 | 0 | 0 | 0 | 0 | 0 | 0 | 0 | 0 |
| −1 | 0 | 1 | 0 | 0 | 1 | 0 | 0 | 0 |
| −2 | 0 | 1 | 0 | 1 | 1 | 0 | 1 | 0 |

TABLE 1-2

| IN | W | PW1 | NW1 | IN | W | PW1 | NW1 | IN | W | PW1 | NW1 |
|----|---|-----|-----|----|---|-----|-----|----|---|-----|-----|
| +1 | +2 | 2 | 0 | 0 | +2 | 0 | 0 | −1 | +2 | 0 | 2 |
| +1 | +1 | 1 | 0 | 0 | +1 | 0 | 0 | −1 | 0 | 0 | 0 |
| +1 | 0 | 0 | 0 | 0 | 0 | 0 | 0 | −1 | 0 | 0 | 0 |

TABLE 1-2-continued

| IN | W | PW1 | NW1 | IN | W | PW1 | NW1 | IN | W | PW1 | NW1 |
|---|---|---|---|---|---|---|---|---|---|---|---|
| +1 | −1 | 0 | 1 | 0 | −1 | 0 | 0 | −1 | −1 | 1 | 0 |
| +1 | −2 | 0 | 2 | 0 | −2 | 0 | 0 | −1 | −2 | 2 | 0 |

In table 1-2, when the input IN is +1 and the weight is +2, the memory cell C11 and C13 of the positive weight group (PW1) generate two higher cell currents which are summarized on the local bit lines LBLA-1, LBLA-2 and then on the global bit line GBL1A; and the memory cell C12 and C14 of the positive weight group (PW1) generate two lower cell currents which cannot be summarized on the local bit lines LBLA-1, LBLA-2 because the related selection switches of the corresponding string select lines (e.g. SSLB1) are off. The memory cell C21 and C23 of the negative weight group (NW1) generate two lower cell currents which are summarized on the local bit lines LBLB-1, LBLB-2 and then neglected; and the memory cell C22 and C24 of the negative weight group (NW1) generate two higher cell currents which cannot be summarized on the local bit lines LBLA-1, LBLA-2 because the related selection switches of the corresponding string select lines (e.g. SSLB1) are off. Thus, when the input IN is +1 and the weight is +2, the positive weight group (PW1) generates two higher cell currents and the negative weight group (NW1) does not generate cell current. Details of others are so on.

In FIG. 3C, each summation group includes a positive weight group and a negative weight group, and each positive (negative) weight group includes a bit line transistor (BLTA-1 or BLTB-1). During operation of FIG. 3C, each summation group receives input IN1 and IN2 from two string select line pairs (SSL1A and SSL1B, and SSL2A and SSL2B), where inputs IN1 and IN2 can be different, and input IN1 can be +1, 0, or −1, and input IN2 can be +1, 0, or −1. That is, the memory device of FIG. 3C can compute 2 inputs simultaneously. The structure of FIG. 3C can compute a 1-bit weight (weight values of +1, 0, or −1).

Generally speaking, FIG. 3C is an extended example of FIG. 1 of the application with concurrently receiving two sets of input IN1 and IN2. FIG. 3C has similar operations in FIG. 2A to FIG. 2I, and thus the details are generally described here.

Operations of FIG. 3C are summarized as the following tables 2-1 and 2-2. How to program the memory cells C11-C24 are the same or similar to the details of FIG. 2A-FIG. 2I. For example, when the weight is +1, then the memory cells C11, C13, C22 and C24 are programmed as low threshold voltage while the memory cells C12, C14, C21 and C23 are programmed as high threshold voltage. Others are so on.

TABLE 2-1

| IN1 | SSL1A | SSL1B | IN2 | SSL2A | SSL2B |
|---|---|---|---|---|---|
| +1 | 1 | 0 | +1 | 1 | 0 |
| 0 | 0 | 0 | 0 | 0 | 0 |
| −1 | 0 | 1 | −1 | 0 | 1 |

TABLE 2-2

| IN1 | IN2 | W | PW1 | NW1 |
|---|---|---|---|---|
| +1 | +1 | +1 | 2 | 0 |
| 0 | +1 | +1 | 1 | 0 |

TABLE 2-2-continued

| IN1 | IN2 | W | PW1 | NW1 |
|---|---|---|---|---|
| −1 | +1 | +1 | 1 | 1 |
| +1 | 0 | +1 | 0 | 0 |
| 0 | 0 | +1 | 0 | 0 |
| −1 | 0 | +1 | 0 | 0 |
| +1 | −1 | +1 | 1 | 1 |
| 0 | −1 | +1 | 0 | 0 |
| −1 | −1 | +1 | 0 | 2 |
| +1 | +1 | 0 | 0 | 0 |
| 0 | +1 | 0 | 0 | 0 |
| −1 | +1 | 0 | 0 | 0 |
| +1 | 0 | 0 | 0 | 0 |
| 0 | 0 | 0 | 0 | 0 |
| −1 | 0 | 0 | 0 | 0 |
| +1 | −1 | 0 | 0 | 0 |
| 0 | −1 | 0 | 0 | 0 |
| −1 | −1 | 0 | 0 | 0 |
| +1 | +1 | −1 | 0 | 2 |
| 0 | +1 | −1 | 0 | 0 |
| −1 | +1 | −1 | 1 | 1 |
| +1 | 0 | −1 | 0 | 0 |
| 0 | 0 | −1 | 0 | 0 |
| −1 | 0 | −1 | 0 | 0 |
| +1 | −1 | −1 | 1 | 1 |
| 0 | −1 | −1 | 0 | 0 |
| −1 | −1 | −1 | 0 | 2 |

In table 2-2, when both the inputs IN1 and IN2 are +1 and the weight is +1, the memory cells C11 and C13 generate two higher cell currents on the local bit line LBLA-1 and summarized on the global bit line GBL1A; and the memory cell C12 and C14 of the positive weight group (PW1) generate two lower cell currents which cannot be summarized on the local bit line LBLA-1 because the related selection switches of the corresponding string select lines (e.g. SSLB1 and SSLB2) are off. The memory cells C21 and C23 of the negative weight group (NW1) generate two lower cell currents on the local bit line LBLB-1 but neglected. The memory cell C22 and C24 of the negative weight group (NW1) generate two higher cell currents which cannot be summarized on the local bit line LBLB-1 because the related selection switches of the corresponding string select lines are off. Thus, when both the inputs IN1 and IN2 are +1 and the weight is +1, the positive weight group (PW1) generates two higher cell currents and the negative weight group (NW1) does not generate cell current. Details of others are so on.

In other words, the memory device of the present embodiment can compute multi-bit weights, in which case multiple bit line transistors can be simultaneously conductive. For example, in the case of computing 3-bit weights (+4, +3, +2, +1, 0, −1, −2, −3, −4), all bit line transistors in the positive weight group and all bit line transistors in the negative weight group are opened. In the positive weight group and the negative weight group, among the memory cells coupled to the selected word lines, up to 4 memory cells can be programmed as low threshold voltage, and the rest of the memory cells are programmed as high threshold voltage. In this way, the memory device of the present embodiment can compute 3-bit weights, where the input is 1 bit (+1, 0, or −1). Other possible embodiment of the application may be used to compute other weights (from +3 to −3, or from +5 to −5 . . . ), depending on the turn-on number of the bit line transistors.

In summary, in the memory device of this embodiment, when computing x-bit weights (covering $+2^{(x-1)}$, $+2^{(x-1)}-1$, . . . , +1, 0, −1, . . . , $-2^{(x-1)}-1$, $-2^{(x-1)}$) (where x is a positive integer), the positive weight group and the negative weight group each include $2^{(x-1)}$ bit line transistors, and all of these $2^{(x-1)}$ bit line transistors are conductive. The x-bit weights cover weights from $+2^{(x-1)}$ to $-2^{(x-1)}$. For example, in the positive weight group, among the memory cells coupled to the selected word lines, if $2^{(x-1)}$ memory cells are programmed as low threshold voltage, the rest are programmed as high threshold voltage, resulting in a positive weight of $+2^{(x-1)}$; or, in the positive weight group, if there are $(2^{(x-1)}-2)$ memory cells programmed as low threshold voltage, the rest are programmed as high threshold voltage, resulting in a positive weight of $(2^{(x-1)}-2)$. This pattern continues. Of course, in both the positive weight group and the negative weight group, if 0 memory cells are programmed as low threshold voltage among those coupled to the selected word lines, the rest are programmed as high threshold voltage, resulting in a combined weight of 0. The method of combining negative weights follows a similar pattern. In the positive weight group, among the memory cells coupled to the selected word lines, y (where y is 0 or a positive integer, y ranging from 0 to $+2^{(x-1)}$) memory cells are programmed as low threshold voltage, and the rest are programmed as high threshold voltage, resulting in a positive weight of $+y$; similarly, in the negative weight group, among the memory cells coupled to the selected word lines, z (where z is 0 or a positive integer, z ranging from 0 to $+2^{(x-1)}$) memory cells are programmed as low threshold voltage, and the rest are programmed as high threshold voltage, resulting in a negative weight of $-z$.

Figure 4:
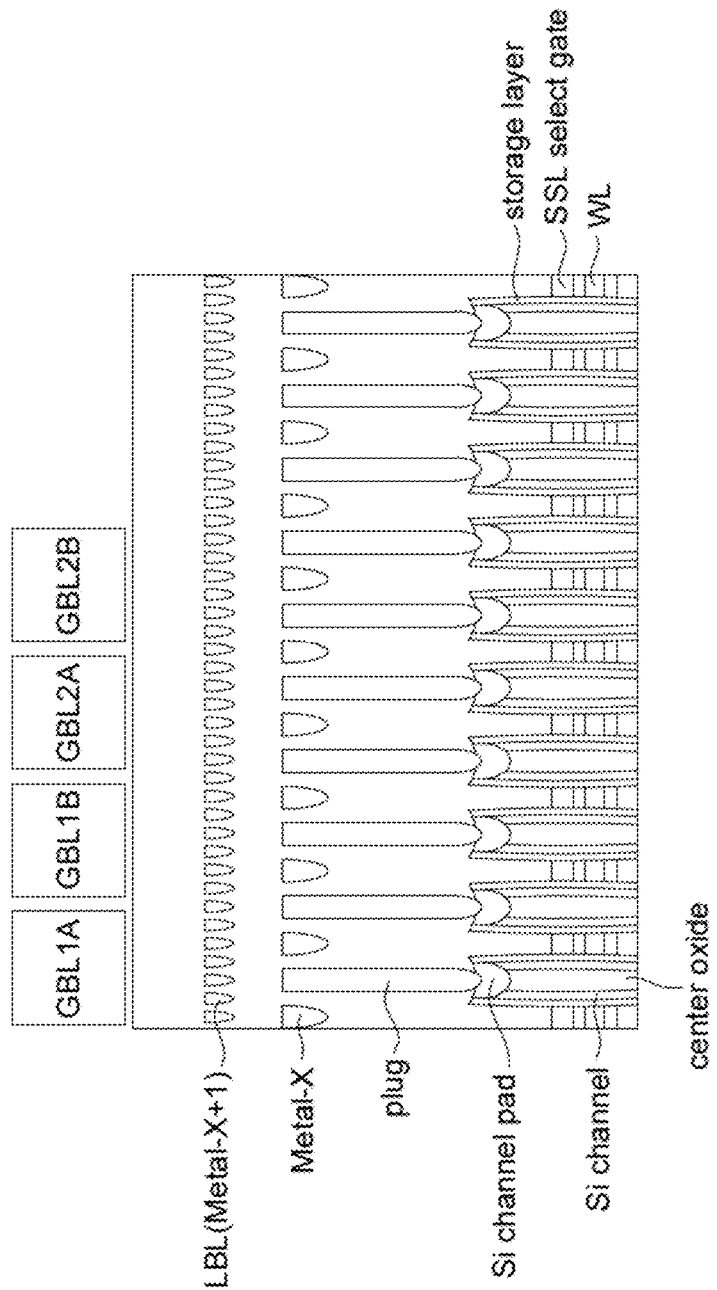
FIG. 4 illustrates a cross-sectional view of the memory device according to an embodiment of the present invention.

FIG. 4 illustrates a cross-sectional view of the memory device according to an embodiment of the present invention. As shown in FIG. 4, in one embodiment of the application, in order to improve the decrease in calculation accuracy caused by severe voltage drop, wider global bit lines (such as GBL1A and GBL1B in FIG. 1) are formed above narrower local bit lines (such as LBLA-1~LBLA-Q in FIG. 1). Additionally, the metal line width of the local bit lines is narrower, while the metal line width of the global bit lines is wider. The pitch (spacing) of local bit lines is very tight (e.g., approximately 20 nanometers), so allowing too much current to flow through the tight-pitch local bit lines will result in severe voltage drop. The wider-pitch and lower-resistance global bit lines (such as GBL1A and GBL1B in FIG. 1) lead to lower voltage drop when current flows through them, thereby minimizing the impact on calculation accuracy. The pitch of the global bit lines is 4-time larger than the pitch of the local bit lines. In other alternative, the line width of the global bit lines is larger than the line width of the local bit lines. In another alternative, the thickness of the global bit lines could be adjusted simultaneously, and the thickness of the global bit lines is thicker than the thickness of the local bit lines to enhance the current capability of the global bit lines.

In this embodiment, input is entered into the memory device through string select line pairs, allowing the summation of cell currents on global bit lines. Additionally, selected word lines can be applied with a selection voltage (Vselected, which can range between low threshold voltage and high threshold voltage), while unselected word lines are applied with a pass voltage (for example but not limited by, 7V).

In this embodiment, the distribution of threshold voltage is adjusted through coarse/fine programming algorithms to achieve the narrowest distribution of low threshold voltage states.

In this embodiment, the currents of multiple local bit lines (e.g., 8 local bit lines) are summed to one global bit line, where the wider spacing of the global bit lines reduces impedance. These local bit lines are connected to the same number of bit line transistors, which are then connected to global bit lines GBL. Global bit line pairs (GBLA/GBLB) are connected to the differential ADC. One of the global bit lines in the global bit line pair (GBL1A, . . . ) collects the current transmitted by the positive weight group, while one of the global bit lines in the global bit line pair (GBL1B, . . . ) collects the current transmitted by the negative weight group.

Due to the ability to transmit larger currents to low-resistance global bit lines GBL, the detection of larger MAC currents is enabled.

In this embodiment, multiple bit line switches are included in both the positive and negative weight groups to achieve multi-bit weight computations. The back-pattern effect would be reduced. In present embodiment, the bit line switches are high-voltage transistors to avoid any possible breakdown events during operation.

During program and erase verification, in the embodiment described herein, a differential ADC is used to sense cell currents along the same path to avoid process variation.

In this embodiment, for example but not limited to, each summation group allows a maximum input of 128 inputs (i.e., requiring 128 string select line pairs), therefore the maximum current=128*16 nA=2 uA. This still falls within the range of MAC currents for tight pitch bit line designs. Therefore, to simultaneously compute 1024 inputs, the 1024 inputs can be divided into 8 groups, with 8 summation groups working together to compute the 1024 inputs, with each summation group computing 128 inputs. In this case, the maximum MAC current is approximately 16 uA. Wide-spaced global bit lines allow for the aggregation of higher bit line currents without affecting calculation accuracy.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A memory device, comprising:
   a plurality of summation groups, each of summation groups including a first weight group and a second weight group, wherein the first weight group comprises a plurality of first memory string pairs, a plurality of first selection switch pairs having a plurality of first selection switches, and one or more first bit line transistors, and the second weight group comprises a plurality of second memory string pairs, a plurality of second selection switch pairs having a plurality of second selection switches, and one or more second bit line transistors;

a plurality of global bit line pairs coupled to the summation groups, wherein the first memory string pairs and the second memory string pairs are coupled to the global bit line pairs through the first selection switch pairs and the second selection switch pairs, respectively;

a plurality of differential analog-to-digital converters (ADCs), each of the differential ADCs is coupled to a corresponding one of the global bit line pairs;

a plurality of string select line pairs, each of the string select line pairs coupled to one of the first selection switch pairs and one of the second selection switch pairs, and each of the string select line pairs is configured to receive one of a plurality of inputs;

a plurality of threshold voltages of a plurality of memory cells of the first memory string pairs of the first weight group are combined to form a plurality of first weights;

a plurality of threshold voltages of a plurality of memory cells of the second memory string pairs of the second weight group are combined to form a plurality of second weights;

wherein, the first weight group generates a first input weight product current on a first global bit line of the global bit line pairs basing on the one of the plurality of inputs, and the second weight group generates a second input weight product current on a second global bit line of the global bit line pairs basing on the one of the plurality of inputs;

the first global bit line and the second global bit line output the first input weight product current and the second input weight product current to a first differential ADC of the differential ADCs; and the first differential ADC outputs a product accumulation operation result basing on the first input weight product current and the second input weight product current.

2. The memory device according to claim 1, wherein the first input weight product current is carried on a plurality of first local bit lines and be summed to the first global bit line of the global bit line pairs;

the second input weight product current is carried on a plurality of second local bit lines and be summed to the second global bit line of the global bit line pairs; and a first metal line width of the first global bit line and the second global bit line is wider than a second metal line width of the first local bit lines and the second local bit lines.

3. The memory device according to claim 2, wherein the first global bit line and the second global bit line are formed above the first local bit lines and the second local bit lines.

4. The memory device according to claim 1, wherein when a first input of the inputs is +1, a first string select line of a first string select line pair of the string select line pairs receives logic 1 and a second string select line of the first string select line pair of the string select line pairs receives logic 0;

when the first input is 0, the first string select line receives logic 0 and the second string select line receives logic 0;

and when the first input is −1, the first string select line receives logic 0 and the second first string select line receives logic 1.

5. The memory device according to claim 1, wherein when a first one of the first weights is +1, a first memory cell of the memory cells of the first weight group is programmed to a first threshold voltage, a second memory cell of the memory cells of the first weight group is programmed to a second threshold voltage, a third memory cell of the memory cells of the second weight group is programmed to the second threshold voltage, and a fourth memory cell of the memory cells of the second weight group is programmed to the first threshold voltage, wherein a conduction current of the memory cell programmed to the first threshold voltage is higher than a conduction current of the memory cell programmed to the second threshold voltage;

when the first one of the first weights is 0, the first, second, third, and fourth memory cells are all programmed to the second threshold voltage;

when a first one of the second weights is −1, the first memory cell is programmed to the second threshold voltage, the second memory cell is programmed to the first threshold voltage, the third memory cell is programmed to the first threshold voltage, and the fourth memory cell is programmed to the second threshold voltage.

6. The memory device according to claim 1, wherein when a first input of the inputs is +1 and a first one of the first weights is +1, the first weight group generates a positive input weight product current;

when the first input is −1 and a first one of the second weights is −1, the first weight group generates the positive input weight product current;

when the first input is −1 and the first one of the first weights is +1, the second weight group generates a negative input weight product current;

when the first input is +1 and the first one of the second weights is −1, the second weight group generates the negative input weight product current; and when at least one of the first input, the first one of the first weights, and the first one of the second weights is 0, the first weight group and the second weight group generate a 0 positive input weight product current and a 0 negative input weight product current.

7. The memory device according to claim 1, wherein when computing an x-bit weight (x is a positive integer), each of the first weight group and the second weight group comprises $2^{(x-1)}$ bit line transistors, all of the $2^{(x-1)}$ bit line transistors are conducting;

the x-bit weight covers a plurality of weights $+2^{(x-1)}$, $+2^{(x-1)}-1, \ldots, +1, 0, -1, \ldots, -2^{(x-1)}-1, -2^{(x-1)}$;

in the first weight group, among a plurality of selected memory cells coupled to a selected word line, y (y is 0 or a positive integer, y ranging from 0 to $+2^{(x-1)}$) memory cells are programmed to a first threshold voltage, and the remaining memory cells are programmed to a second threshold voltage to combine to a positive weight +y; and in the second weight group, among a plurality of selected memory cells coupled to a selected word line, z (z is 0 or a positive integer, z ranging from 0 to $+2^{(x-1)}$) memory cells are programmed to the first threshold voltage, and the remaining memory cells are programmed to the second threshold voltage to combine to a negative weight −z.

8. The memory device according to claim 1, wherein the first bit line transistors and the second bit line transistors are high voltage transistors.

9. The memory device according to claim 1, wherein one of the first weight group and the second weight group represents a positive weight group, and another one of the first weight group and the second weight group represents a negative weight group.

10. The memory device according to claim 1, wherein the plurality of string select line pairs are configured to receive the plurality of inputs simultaneously.

11. A computing method for a memory device, comprising:
inputting a plurality of inputs to a plurality of summation groups of the memory device through a plurality of string select line pairs, each of summation groups including a first weight group and a second weight group, a plurality of threshold voltages of a plurality of memory cells of the first memory string pairs of the first weight group combined to form a plurality of first weights, a plurality of threshold voltages of a plurality of memory cells of the second memory string pairs of the second weight group are combined to form a plurality of second weights;
generating by the first weight group a first input weight product current on a first global bit line of the global bit line pairs basing on the one of the plurality of inputs, and generating by the second weight group a second input weight product current on a second global bit line of the global bit line pairs basing on the one of the plurality of inputs;
outputting the first input weight product current and the second input weight product current from the first global bit line and the second global bit line to a first differential ADC of the differential ADCs; and
outputting from the first differential ADC a product accumulation operation result basing on the first input weight product current and the second input weight product current.

12. The computing method according to claim 11, wherein
the first input weight product current is carried on a plurality of first local bit lines and be summed to the first global bit line of the global bit line pairs;
the second input weight product current is carried on a plurality of second local bit lines and be summed to the second global bit line of the global bit line pairs; and
a first metal line width of the first global bit line and the second global bit line is wider than a second metal line width of the first local bit lines and the second local bit lines.

13. The computing method according to claim 12, wherein the first global bit line and the second global bit line are formed above the first local bit lines and the second local bit lines.

14. The computing method according to claim 11, wherein
when a first input of the inputs is +1, a first string select line of a first string select line pair of the string select line pairs receives logic 1 and a second string select line of the first string select line pair of the string select line pairs receives logic 0;
when the first input is 0, the first string select line receives logic 0 and the second string select line receives logic 0;
and when the first input is −1, the first string select line receives logic 0 and the second first string select line receives logic 1.

15. The computing method according to claim 11, wherein when a first one of the first weights is +1, a first memory cell of the memory cells of the first weight group is programmed to a first threshold voltage, a second memory cell of the memory cells of the first weight group is programmed to a second threshold voltage, a third memory cell of the memory cells of the second weight group is programmed to the second threshold voltage, and a fourth memory cell of the memory cells of the second weight group is programmed to the first threshold voltage, wherein a conduction current of the memory cell programmed to the first threshold voltage is higher than a conduction current of the memory cell programmed to the second threshold voltage;
when the first one of the first weights is 0, the first, second, third, and fourth memory cells are all programmed to the second threshold voltage;
when a first one of the second weights is −1, the first memory cell is programmed to the second threshold voltage, the second memory cell is programmed to the first threshold voltage, the third memory cell is programmed to the first threshold voltage, and the fourth memory cell is programmed to the second threshold voltage.

16. The computing method according to claim 11, wherein
when a first input of the inputs is +1 and a first one of the first weights is +1, the first weight group generates a positive input weight product current;
when the first input is −1 and a first one of the second weights is −1, the first weight group generates the positive input weight product current;
when the first input is −1 and the first one of the first weights is +1, the second weight group generates a negative input weight product current;
when the first input is +1 and the first one of the second weights is −1, the second weight group generates the negative input weight product current; and
when at least one of the first input, the first one of the first weights, and the first one of the second weights is 0, the first weight group and the second weight group generate a 0 positive input weight product current and a 0 negative input weight product current.

17. The computing method according to claim 11, wherein
when computing an x-bit weight (x is a positive integer), each of the first weight group and the second weight group comprises $2^{(x-1)}$ bit line transistors, all of the $2^{(x-1)}$ bit line transistors are conducting;
the x-bit weight covers a plurality of weights $+2^{(x-1)}$, $+2^{(x-1)}-1, \ldots, +1, 0, -1, \ldots, -2^{(x-1)}-1, -2^{(x-1)}$;
in the first weight group, among a plurality of selected memory cells coupled to a selected word line, y (y is 0 or a positive integer, y ranging from 0 to $+2^{(x-1)}$) memory cells are programmed to a first threshold voltage, and the remaining memory cells are programmed to a second threshold voltage to combine to a positive weight +y; and
in the second weight group, among a plurality of selected memory cells coupled to a selected word line, z (z is 0 or a positive integer, z ranging from 0 to $+2^{(x-1)}$) memory cells are programmed to the first threshold voltage, and the remaining memory cells are programmed to the second threshold voltage to combine to a negative weight −z.

18. The computing method according to claim 11, wherein the first bit line transistors and the second bit line transistors are high voltage transistors.

19. The computing method according to claim 11, wherein one of the first weight group and the second weight group represents a positive weight group, and another one of the first weight group and the second weight group represents a negative weight group.

20. The computing method according to claim 11, wherein the plurality of string select line pairs are configured to receive the plurality of inputs simultaneously.

* * * * *